May 28, 1968 W. MIESSEN 3,385,191
PHOTOGRAPHIC SHUTTER
Filed Oct. 21, 1965
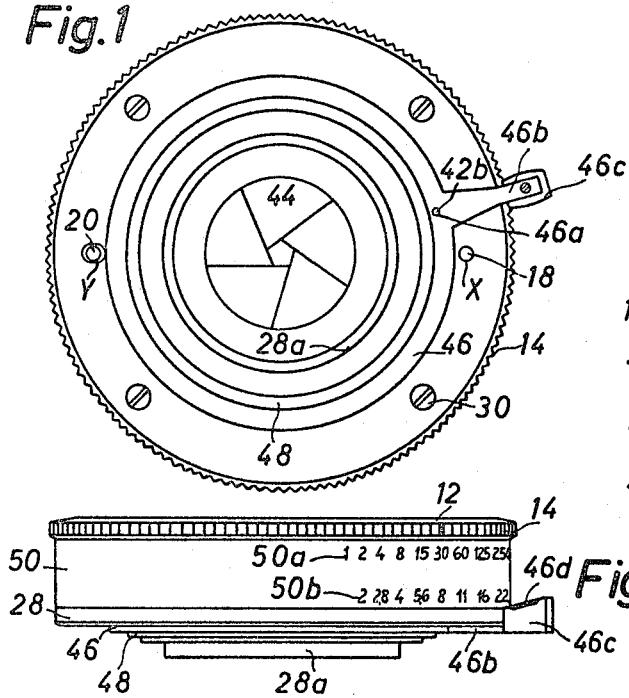
Fig.1
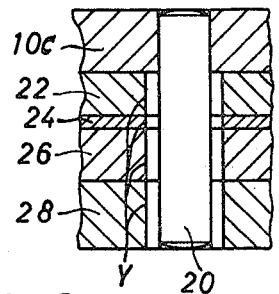
Fig.4
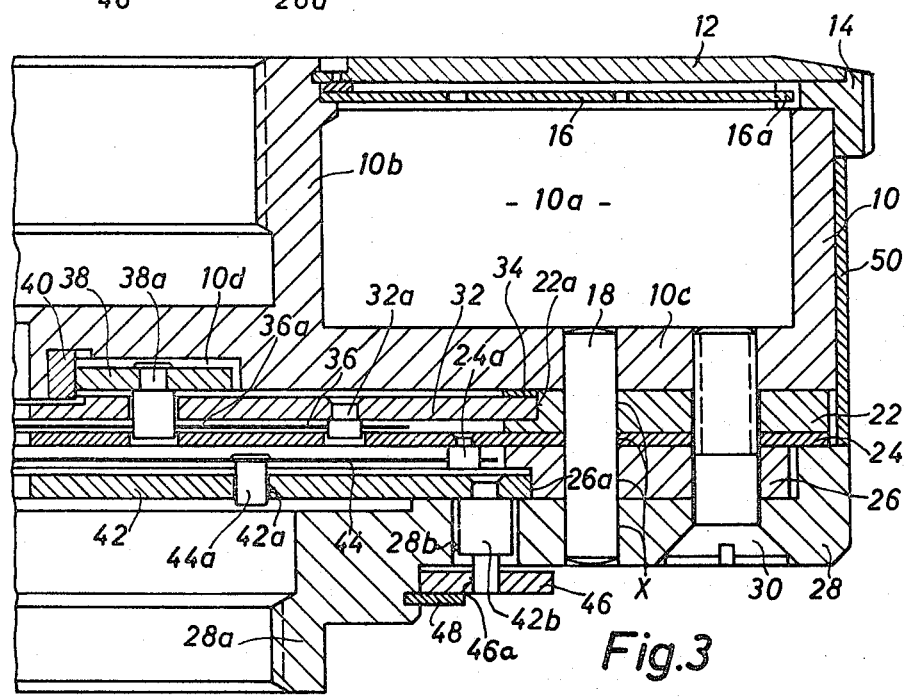
Fig.2
Fig.3

United States Patent Office 3,385,191
Patented May 28, 1968

3,385,191
PHOTOGRAPHIC SHUTTER
Walter Miessen, Munich, Germany, assignor to Compur-Werk Gesellschaft mit beschrankter Haftung & Co.
Filed Oct. 21, 1965, Ser. No. 499,546
Claims priority, application Germany, Mar. 29, 1965,
C 35,449
5 Claims. (Cl. 95—59)

ABSTRACT OF THE DISCLOSURE

A photographic shutter comprising a housing, shutter blades and/or diaphragm blades, and associated driving rings for operating the blades arranged in the housing is provided with a plurality of annular disc-shaped spacers. The spacers which are superimposed on the housing and surround the optical axis thereof define spaces wherein the blades and their associated driving rings can be installed. The spacers are located in their appropriate positions by a pair of pins and are mounted on the housing by at least one screw.

---

This invention relates to a photographic shutter with shutter blades and/or diaphragm blades which, in each case, can be operated through at least one driving ring.

It is an object of the present invention to provide for the installation of the shutter blades or the diaphragm blades together with the associated driving rings, in the shutter by means of simple constructional elements which can be economically manufactured, and to allow for the assembly or dismantling of these constructional elements to be performed with a minimum expenditure of time and auxiliary means. These objects are met, in accordance with the present invention, by the fact that a number of spacers or distance pieces of annular disc form are superimposed on the rear wall of the shutter housing to define annular spaces in which the said blades and their associated driving rings can be installed, these distance pieces being held in the requisite relative angular positions by means of two locating pins which are mounted in the shutter housing and engage in openings in the distance pieces, and are connected to the shutter housing by screws. In this way the constructional elements can be cheaply produced in the form of turned or stamped parts in a mass production, and can readily be connected to the shutter housing in the correct annular positions, to provide for installation of the shutter and diaphragm blades, or can be detached from the shutter housing very simply if and when this is required.

In accordance with a further feature of the invention the locating pins are arranged parallel to the optical axis and the means for operating the screw are accessible from the rear side of the shutter housing. This arrangement enables the spacers, together with the shutter and diaphragm blades, to be installed or removed without a penetration of the actual shutter housing, which is a closed unit.

In addition it is of advantage to provide at least one of the spacers at its inner side with a cylindrical guide surface for one of the driving rings. This dispenses with special guiding elements for said driving ring.

In accordance with a further feature of the invention it is of advantage if the arrangement is so devised that the outer spacer has a tapped tube for an objective member and a cylindrical guide projection for an outer operating ring. The two locating pins are therefore called upon for registering both the rear objective tube and the operating ring relatively to the shutter housing, this affording a further simplification of the construction.

It is further of advantage to cover the outer edges of the spacers at least partially by a band which is fastened to the periphery of the shutter housing and, preferably, carries the setting scales. The abutting parts of the spacers are thereby covered in a very simple fashion and the external appearance of the shutter is improved.

In this specification an example of embodiment of the invention will now be explained in more detail with reference to the accompanying drawings, in which:

FIGS. 1 and 2 are respectively a plan view and a side view of a shutter,

FIG. 3 shows part of the shutter on an enlarged scale, and in cross section, and FIG. 4 shows a detail of the structure seen in FIG. 3.

The shutter illustrated in the drawings includes an annular shutter housing 10, for example of aluminum, which is of U-shape in cross section and is closed at the front by an annular front plate 12. A setting ring 14 is rotatably mounted at the circumferential margin of the shutter housing 10 beneath the front plate, and this ring 14 is positively coupled at 16a to an exposure time control ring 16. Installed in the annular space 10a of the shutter housing 10 are various known types of shutter mechanisms (main driving means, escapement mechanism, delay mechanism, flash light contact device or the like). The inner annular wall 10b of the shutter housing 10 is formed as a screw threaded tube to receive the front objective member (not shown).

The shutter is equipped with shutter blades and diaphragm blades. These two systems and the driving and control rings associated therewith are assembled in the following fashion:

Fastened in the rear wall 10c of the shutter housing 10 are two locating pins 18 and 20, disposed at an exact distance from one another and from the optical axis, and parallel to the latter. In addition a number of spacers 22, 24, 26, 28 of annular disc form, are aligned with one another on this wall 10c in such a way that they are accurately registered by the two locating pins relatively to one another and in relation to the optical axis and held in the requisite angular positions. To this end, each spacer has a tight fitting bore X which accommodates the locating pin 18, whilst it has a longitudinal guide slot Y which takes the other locating pin 20. A number of counter sunk screws 30 ensure the connection of the spacers, registered in this way, to the shutter housing 10, these screws 30 passing with a clearance through corresponding holes in the spacers, engaging in tapped holes in the shutter housing 10 and having their heads bearing against the outer distance piece 28. Since the working slits for the screws 30 are accessible from the rear side of the shutter, the connection, or unfastening, of the parts 22 to 28 with the shutter housing 10 can be implemented without having to insert any tool in the annular space 10a of the shutter.

The spacers 22 and 26 are formed as annular discs with a guide projection, 22a and 26a respectively, so that they can be made as turned parts from a steel tube, a brass tube, or the like on automatic machines, with the requisite accuracy. The guide openings X, Y as well as the perforations which are otherwise still required, can be punched out of the finished turned parts. The spacer 24 is stamped out of steel plate as a flat annular disc, and the necessary guide openings X, Y, and the other perforations can be stamped at the same time in one operation. The outer spacer 28 is fabricated as an aluminum annular flange with a threaded tubular portion 28a by a turning operation. In this part again, the guide openings X, Y and the other perforations are formed by punching out the turned part.

It is noteworthy that the spacers of this character can be made as simple turned and punched parts by a mass production method with consequent economy.

During the installation and anchorage of the distance pieces on the rear wall of the shutter housing, as above explained, these constructional parts define a number of adjacent annular spaces in which the shutter blades and the diaphragm blades can be installed as follows, together with their driving rings:

A blade mounting ring 32 is disposed in the guide projection 22a of the part 22, and is held against axial movement by means of the disc 34 and against radial movement by means which have not been illustrated. Five shutter blades 36 are introduced into the annular space between the parts 32 and 24 in such a way that each blade is pivotally mounted on a pin 32a of the blade mounting ring 32 and accommodates, in the control slot 36a thereof, a control pin 38a of a driving ring 38, which is disposed in a counter sink 10d in the shutter housing 10 and is rotatably mounted on a guide bush 40 of plastics material. The driving ring 38 has a radial arm (not shown) which engages in the annular space 10a and is here coupled with the main driving means for the purpose of motivating a reciprocating movement of the ring 38 and a consequent opening and closing of the shutter blades 36.

A diaphragm control ring 42 is rotatably mounted in the guide projection 26a of the part 26 and is furnished with control slots 42a. Five diaphragm blades 44 are installed in the annular space between the ring 42 and the part 44, each being pivotally mounted on a pin 24a of the part 24 and having its control pin 44a engaging in the control slots 42a of the diaphragm control ring 42.

A diaphragm setting ring 46 is provided for adjustment of the ring 42, and this ring 46 is mounted for rotation on a guide collar of the part 28 and is held against axial movement by a spring ring 48 which is seated in the part 28. A pin 42b provides the driving coupling between the two rings 42 and 46, this pin 42b being firmly seated in the ring 42, passing through an arcuate opening 28b of the part 28, and positively engaging in a driving hole 46a in the ring 46. The ring 46 is also equipped with a radial arm 46b having a setting knob 46c which carries a setting mark 46d at its front side. A band 50 is fastened to the periphery of the shutter housing 10 in such a way, for example being anchored by screws at its ends, that it covers the abutment edges of the aligned parts 10, 22, 24 and 26. An exposure time scale 50a and a diaphragm scale 50b are provided on the band 50.

Finally, it is also pointed out that the constructional parts 22, 26 and 28 which have been described in the above example as being turned elements, could instead be composed of a number of flat stampings, if this is called for by special operating or finishing requirements.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a housing, shutter blades and diaphragm blades arranged in said housing, driving rings for operating said blades, a number of spacers of annular disc form superimposed on the rear wall of the housing and surrounding the optical axis of said housing, the inner surfaces of said spacers defining annular spaces in which said blades and their associated driving rings can be installed, two locating pins mounted in the housing and engaging in openings in the said spacers, for holding the spacers and the housing in the requisite relative angular positions, and at least one screw connecting said spacers to the housing, whereby removal of one of said spacers permits access to the shutter blades and the associated driving ring while removal of another of said spacers permits access to the diaphragm blades and the associated driving ring.

2. A photographic shutter according to claim 1 characterised by the fact that the locating pins are arranged parallel to the optical axis of said housing and the means for actuating the screw is accessible from the rear side of the shutter housing.

3. A photographic shutter according to claim 1 characterised by the fact that at least one of the spacers has on the inside thereof a cylindrical guide surface for one of the driving rings.

4. A photographic shutter according to claim 1 characterised by the fact that the outer spacer has a screw threaded tube for an objective member and a cylindrical guide projection for an outer operating ring.

5. A photographic shutter according to claim 1 characterised by the fact that the outer edges of the spacer are at least partially covered by a band fastened to the periphery of the housing and preferably carrying the setting scales.

References Cited

UNITED STATES PATENTS

| | | | |
|---|---|---|---|
| 524,670 | 8/1894 | Rudolph et al. | 95—63 |
| 2,480,973 | 9/1949 | Schwarz | 95—64 |

JOHN M. HORAN, *Primary Examiner.*